United States Patent
Rajendran

(10) Patent No.: US 12,507,179 B2
(45) Date of Patent: *Dec. 23, 2025

(54) WIRELESS COMMUNICATION SYSTEMS FOR DYNAMICALLY SCALING POWER OF SYNCHRONIZATION SIGNAL BLOCK AND CHANNEL STATE INFORMATION REFERENCE SIGNAL

(71) Applicant: DISH Wireless L.L.C., Englewood, CO (US)

(72) Inventor: Karupaiah Rajendran, Highlands Ranch, CO (US)

(73) Assignee: DISH Wireless L.L.C., Englewood, CO (US)

( * ) Notice: Subject to any disclaimer, the term of this patent is extended or adjusted under 35 U.S.C. 154(b) by 413 days.

This patent is subject to a terminal disclaimer.

(21) Appl. No.: 18/091,074

(22) Filed: Dec. 29, 2022

(65) Prior Publication Data
US 2024/0224197 A1    Jul. 4, 2024

(51) Int. Cl.
*H04W 52/36* (2009.01)
*H04W 52/28* (2009.01)

(52) U.S. Cl.
CPC ......... *H04W 52/36* (2013.01); *H04W 52/285* (2013.01)

(58) Field of Classification Search
CPC . H04W 52/36; H04W 52/285; H04W 52/343; H04W 52/143; H04W 52/325;
(Continued)

(56) References Cited

U.S. PATENT DOCUMENTS

| | | |
|---|---|---|
| 2009/0232239 A1 | 9/2009 | Ko et al. |
| 2012/0094709 A1 | 4/2012 | Ogawa et al. |

(Continued)

FOREIGN PATENT DOCUMENTS

| | | |
|---|---|---|
| WO | WO 2012/145718 | 10/2012 |
| WO | WO 2015/013968 A1 | 2/2015 |
| WO | WO 2015/077931 | 6/2015 |

OTHER PUBLICATIONS

[No Author Listed], "Corrections on Beam Failure Recovery," Presented at the 3GPP TSG RAN WG1 Meeting #92, Feb. 26-Mar. 2, 2018, Athens, Attica, Greece, 4 pages.
(Continued)

*Primary Examiner* — Lana N Le
(74) *Attorney, Agent, or Firm* — Fish & Richardson P.C.

(57) ABSTRACT

A base station configured to perform a power scaling in a wireless communication system includes at least one processor configured to receive signals from one or more user equipment (UE), the signals including at least one parameter indicative of corresponding operating conditions at the one or more UEs, determine an initial synchronization signal block (SSB) transmission power, determine, based on the at least one parameter, that the initial SSB transmission power is to be adjusted to affect the corresponding operating condition, responsive to determining that the initial SSB transmission power is to be adjusted, compute a first scaling value, compute a first scaling factor, adjust the initial SSB transmission power based on the first scaling value and the first scaling factor to compute an adjusted transmission power, and transmit the SSB based on the adjusted transmission power.

16 Claims, 7 Drawing Sheets

(58) Field of Classification Search
CPC ............. H04W 52/362; H04W 52/146; H04W 52/367; H04W 72/23; H04W 52/38; H04W 52/48; H04W 52/228; H04W 52/16; H04W 56/001; H04W 56/00; H04W 72/0473; H04W 52/247; H04W 52/18; H04W 72/231; H04W 72/232; H04W 74/006; H04W 72/21; H04W 52/248

See application file for complete search history.

(56) References Cited

U.S. PATENT DOCUMENTS

| | | | |
|---|---|---|---|
| 2014/0119311 A1 | 5/2014 | Weber et al. | |
| 2016/0277942 A1 | 9/2016 | Chande et al. | |
| 2017/0164301 A1* | 6/2017 | Jeon | H04W 52/143 |
| 2018/0184344 A1 | 6/2018 | Periyasamy et al. | |
| 2018/0310258 A1 | 10/2018 | Goria | |
| 2022/0086769 A1* | 3/2022 | Guo | H04W 52/146 |
| 2022/0182949 A1* | 6/2022 | Lei | H04W 52/325 |
| 2023/0062577 A1* | 3/2023 | Rudolf | H04W 74/002 |
| 2023/0105748 A1* | 4/2023 | Abedini | H04W 52/325 |
| 2023/0126705 A1* | 4/2023 | Abotabl | H04W 52/245 455/522 |
| 2023/0262696 A1* | 8/2023 | Chen | H04W 72/23 |
| 2024/0224195 A1* | 7/2024 | Rajendran | H04W 52/241 |
| 2024/0284344 A1* | 8/2024 | Lo | H04W 52/143 |

OTHER PUBLICATIONS

[No Author Listed], "Discussion on scaling RSRP threshold for beam failure," Presented at the 3GPP TSG-RAN WG2 Meeting #104, Nov. 12-16, 2018, Spokane, Wa, USA, 2 pages.

International Search Report and Written Opinion in International Appln. No. PCT/US2023/086534, mailed on May 15, 2024, 13 pages.

International Preliminary Report on Patentability in International Appln. No. PCT/US2023/086534, mailed on Jul. 10, 2025, 10 pages.

* cited by examiner

| A | A |  |  |  |  |  | B | C | B | C |  |  |
|---|---|---|---|---|---|---|---|---|---|---|---|---|
| A | A |  |  |  |  |  | B | C | B | C |  |  |
| A | A |  |  |  |  |  | B | C | B | C |  |  |
| A | A |  |  |  |  |  | B | C | B | C |  |  |
| A | A |  |  |  |  |  | B | C | B | C |  |  |
| A | A |  |  |  |  |  | B | C | B | C |  |  |
| A | A |  |  |  |  |  | B | C | B | C |  | D |
| A | A |  |  |  |  |  | B | C | B | C |  | D |
| A | A |  |  |  |  |  | B | C | B | C |  | E |
| A | A |  |  |  |  |  | B | C | B | C |  | E |
| A | A |  |  |  |  |  | B | C | B | C |  | E |
| A | A |  |  |  |  |  | B | C | B | C |  | E |

302

| A | A |  |  |  |  |  | B | C | B | C |  |  |
|---|---|---|---|---|---|---|---|---|---|---|---|---|
| A | A |  |  |  |  |  | B | C | B | C |  |  |
| A | A |  |  |  |  |  | B | C | B | C |  |  |
| A | A |  |  |  |  |  | B | C | B | C |  |  |
| A | A |  |  |  |  |  | B | C | B | C |  | D |
| A | A |  |  |  |  |  | B | C | B | C |  | D |
| A | A |  |  |  |  |  | B | C | B | C |  | D |
| A | A |  |  |  |  |  | B | C | B | C |  | D |
| A | A |  |  |  |  |  | B | C | B | C |  | E |
| A | A |  |  |  |  |  | B | C | B | C |  | E |
| A | A |  |  |  |  |  | B | C | B | C |  | E |
| A | A |  |  |  |  |  | B | C | B | C |  | E |

<u>400</u>

530

Determining at least one of cell load, a mobility success rate, or interference measurement
531

Determining that the initial SSB transmission power is to be adjusted based on the determined at least one of cell load, a mobility success rate, or interference measurement
532

WIRELESS COMMUNICATION SYSTEMS FOR DYNAMICALLY SCALING POWER OF SYNCHRONIZATION SIGNAL BLOCK AND CHANNEL STATE INFORMATION REFERENCE SIGNAL

TECHNICAL FIELD

The present disclosure relates to a wireless communication system, and more particularly, a method of scaling transmission power of a synchronization signal block (SSB) or a channel state information-reference signal (CSI-RS).

BACKGROUND

A conventional network provides voice and data services to a user equipment (UE) in geographical areas covered by the network. For example, the UE can transmit and receive data in the covered areas using a base station (BS) of the network or a partner network within the covered areas, where the UE is provided with mobility.

For the UE to transmit and receive data through the BS, the UE searches for Synchronization Signals (SS) periodically when scanning for a cell to camp on where the SS blocks and Physical Broadcast Channel (PBCH) blocks are used during the cell search procedure.

Furthermore, the BS can configure a Channel State Information (CSI) Reference Signal (RS) for CSI reporting, beam management, connected mode mobility, radio link failure detection, beam failure detection and recover, and fine tuning of time and frequency synchronization.

SUMMARY

The present disclosure is directed to adjusting transmission power of a SSB or CSI-RS.

According to one aspect of the subject matter described in this application, a method for performing a power scaling at a base station (BS) of a wireless communication system can include receiving signals from one or more user equipment (UE), the signals including at least one parameter indicative of corresponding operating conditions at the one or more UEs, determining an initial synchronization signal block (SSB) transmission power, determining, based on the at least one parameter, that the initial SSB transmission power is to be adjusted to affect the corresponding operating condition, responsive to determining that the initial SSB transmission power is to be adjusted, computing a first scaling value, computing a first scaling factor, adjusting the initial SSB transmission power based on the first scaling value and the first scaling factor to compute an adjusted transmission power, and transmitting the SSB based on the adjusted transmission power.

Implementations according to this aspect can include one or more of the following features. For example, the first scaling value can be computed based on the at least one parameter.

In some implementations, the at least one parameter can be indicative of a failure rate associated with the one or more UEs. In some examples, the first scaling factor can increase with the failure rate.

In some implementations, determining that the transmission power is to be adjusted can include determining at least one of cell load, a mobility success rate, or interference measurement based on the corresponding at least one parameter, and determining that the transmission power is to be adjusted based on the determined at least one of the cell load, the mobility success rate, or the interference measurement. In some examples, the transmission power for the SSB can be adjusted to a value determined as a product of the scaling value and the scaling factor.

In some implementations, the method can further include determining an initial channel state information-reference signal (CSI-RS) transmission power, determining, based on the at least one parameter, that the CSI-RS transmission power is to be adjusted in accordance with the corresponding operating condition, responsive to determining that the CSI-RS transmission power is to be adjusted, computing a second scaling value, computing a second scaling factor, adjusting the initial CSI-RS transmission power based on the second scaling value and the second scaling factor to compute an adjusted CSI-RS transmission power, and transmitting the CSI-RS based on the adjusted CSI-RS transmission power. In some examples, the second scaling value can be determined based on the at least one parameter.

In some implementations, the at least one parameter can be indicative of a failure rate associated with the one or more UEs. In some examples, the second scaling factor can increase with the failure rate.

According to another aspect of the subject matter described in this application, a base station for performing a power scaling in a wireless communication system can include memory, at least one transceiver, and at least one processor coupled to the memory and the transceiver. The at least one processor can be configured to receive signals from one or more user equipment (UE), the signals including at least one parameter indicative of corresponding operating conditions at the one or more UEs, determine an initial synchronization signal block (SSB) transmission power, determine, based on the at least one parameter, that the initial SSB transmission power is to be adjusted to affect the corresponding operating condition, responsive to determining that the initial SSB transmission power is to be adjusted, compute a first scaling value, compute a first scaling factor, adjust the initial SSB transmission power based on the first scaling value and the first scaling factor to compute an adjusted transmission power, and transmit the SSB based on the adjusted transmission power.

Implementations according to this aspect can include one or more of the following features. For example, the first scaling value can be computed based on the at least one parameter.

In some implementations, the at least one parameter can be indicative of a failure rate associated with the one or more UEs. In some examples, the first scaling factor can increase with the failure rate.

In some implementations, determining that the transmission power is to be adjusted can include determining at least one of cell load, a mobility success rate, or interference measurement based on the corresponding at least one parameter, and determining that the transmission power is to be adjusted based on the determined at least one of the cell load, the mobility success rate, or the interference measurement. In some implementations, the transmission power for the SSB can be adjusted to a value determined as a product of the scaling value and the scaling factor.

In some implementations, the at least one processor can be further configured to determine an initial channel state information-reference signal (CSI-RS) transmission power, determine, based on the at least one parameter, that the CSI-RS transmission power is to be adjusted in accordance with the corresponding operating condition, responsive to determining that the CSI-RS transmission power is to be adjusted, compute a second scaling value, compute a second scaling factor, adjust the initial CSI-RS transmission power based on the second scaling value and the second scaling factor to compute an adjusted CSI-RS transmission power, and transmit the CSI-RS based on the adjusted CSI-RS transmission power. In some examples, the second scaling value can be computed based on the at least one parameter.

In some examples, the at least one parameter can be indicative of a failure rate associated with the one or more UEs. In some examples, the second scaling factor can increase with the failure rate.

BRIEF DESCRIPTION OF THE DRAWINGS

FIG. 3 is a diagram illustrating an example of resource blocks.

DETAILED DESCRIPTION

Synchronization signal block (SSB) and channel state information-reference signal (CSI-RS) are transmitted from a gNodeB (or gNB)—a base station in a 5G New Radio (also referred to simply as 5G)—to coordinate connections with user equipment (UEs). A power level of these signals affects various operating conditions of a gNB such as the area of coverage provided by a particular gNB and/or the number of UEs that the gNB is able to serve. For example, a high SSB power can allow a larger area of coverage thereby allowing UEs at a large distance from the gNB to connect to the gNB. While this may be desirable in some cases (e.g., when gNBs are located far apart from one another), when two gNBs are close to one another, a high SSB power can degrade network performance. For example, high SSB power can result in a large overlap in the coverage areas of the two gNBs—thereby causing each gNB to potentially act as a source of interference with respect to the other. On the other hand, if the SSB power is such that there is no overlap or insufficient overlap between the areas of the two gNBs, hand-off failure rates for UEs moving from the coverage area of one to the other can be high. The technology described herein allows for dynamic scaling of SSB and/or CSI-RS power levels in accordance with various operating conditions such as desired coverage, network capacity, quality of connections, etc. This in turn can improve network performance (e.g., by reducing hand-off failures, optimizing gNB capacities, optimizing power usage etc.) as compared to situations where fixed power levels are used for SSBs and/or CSI-RS.

Figure 1:
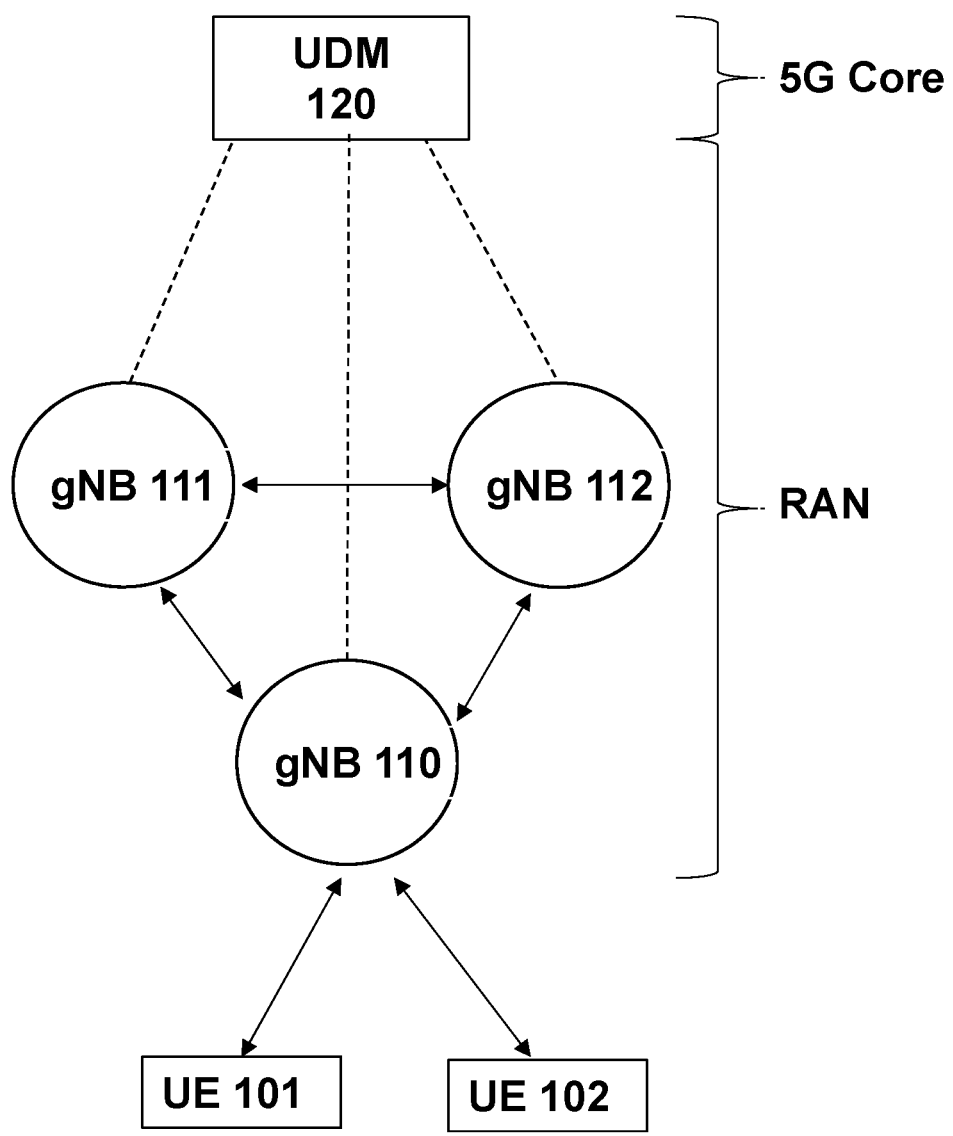
FIG. 1 is a diagram illustrating an example of a wireless communication system.

FIG. 1 is a diagram illustrating an example of a wireless communication system 100. Referring to FIG. 1, a wireless communication system 100 can include user equipment (UE) 101 and 102, a RAN, and a core network (e.g., 5$^{th}$ generation core network or Satellite Network).

The UE 101 can include a terminal, Mobile Equipment (ME), or Mobile Station (MS). The UE 101 can be a portable device such as a notebook computer, mobile phone, Personal Digital Assistant (PDA), smart phone, or a multimedia device, or a fixed device such as a Personal Computer (PC) or vehicle-mounted device. The UE 101 can include a communication module configured to transmit and receive a signal, a processor configured to control the communication module, and a memory configured to store information.

The RAN can include at least one RAN node. The RAN node can include at least one of gNodeBs (gNBs) 110, 111, and 112 (e.g., a base station supporting 5G New Radio or Satellite).

The core network can include a united data management (UDM) module 120. The core network can further include an access and mobility management function (AMF), a user plane function (UPF), and a session management function (SMF). The AMF can host the functions, such as non-access stratum (NAS) security, idle state mobility handling, etc. The AMF can be an entity including the functions of a conventional MME. The UPF can host the functions, such as mobility anchoring, protocol data unit (PDU) handling. The UPF can be an entity including the functions of the conventional S-GW. The SMF can host the functions, such as UE IP address allocation and PDU session control.

The UDM module 120 can be configured to manage data for access authorization, user registration, and data network profiles. Subscriber data can be provided to the SMF, which allocates IP addresses and manages user sessions on the network. In some implementations, the UDM module can send and store data. The AMF can receive user information sent through the network and forward the information to the SMF, which uses it to determine what session manager would be best assigned to the user. For example, the SMF can be a gateway from the user plane to the control plane of the network.

Each of the at least one of gNBs 110, 111 and 112 can be a network node in charge of transmission/reception of wireless signals with the UE 101 and the UE 102. The gNB can support functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF module upon attachment of a UE, user plane data routing to an UPF(s), control plane information routing to an AMF module, connection setup and release, the scheduling and transmission of a paging message (generated from an AMF module), the scheduling and transmission of system broadcast information, a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, and dual connectivity.

Figure 2:
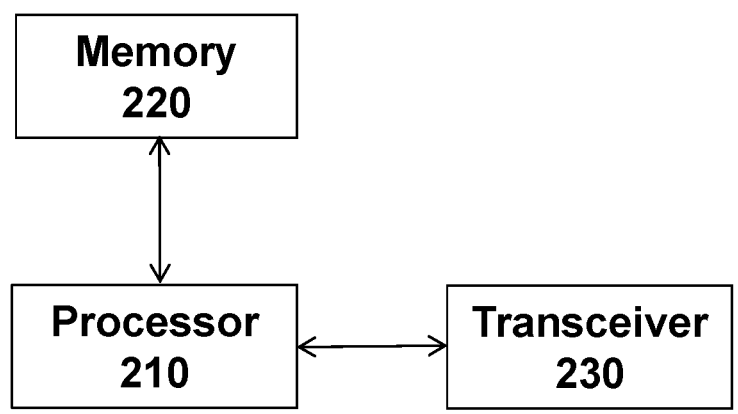
FIG. 2 is a diagram illustrating an example of a computing environment.

FIG. 2 is a diagram illustrating an example of a computing device 200 that is employed to execute implementations of the present disclosure. The computing device 200 is intended to represent various forms of digital computers, such as laptops, desktops, workstations, personal digital assistants, servers, blade servers, mainframes, and other appropriate computers. The computing device 200 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 200 can form at least a portion of the application installation environment described above.

Referring to FIG. 2, the computing environment 200 can include a processor 210, a memory 220 and a transceiver 230. In some implementations, the processor 210 can perform various operations described below with respect to FIGS. 3-7. For example, the processor 210 can be implemented in the core network and perform receiving signals from one or more user equipment (UE), the signals including at least one parameter indicative of corresponding operating conditions at the one or more UEs, determining an initial synchronization signal block (SSB) transmission power, determining, based on the at least one parameter, that the initial SSB transmission power is to be adjusted to affect the corresponding operating condition, responsive to determining that the initial SSB transmission power is to be adjusted, computing a first scaling value, computing a first scaling factor, adjusting the initial SSB transmission power based on the first scaling value and the first scaling factor to compute an adjusted transmission power, and transmitting the SSB based on the adjusted transmission power. By way of further example, the processor can perform determining an initial channel state information-reference signal (CSI-RS) transmission power, determining, based on the at least one parameter, that the CSI-RS transmission power is to be adjusted in accordance with the corresponding operating condition, responsive to determining that the CSI-RS transmission power is to be adjusted, computing a second scaling value, computing a second scaling factor, adjusting the initial CSI-RS transmission power based on the second scaling value and the second scaling factor to compute an adjusted CSI-RS transmission power, and transmitting the CSI-RS based on the adjusted CSI-RS transmission power.

The transceiver 230 can be connected to the processor 210 and configured to transmit and receive radio signals. The processor 210 can include application-specific integrated circuits (ASICs), other chipsets, logic circuits and/or data processing devices. The memory 220 can include read-only memory (ROM), random access memory (RAM), flash memory, memory cards, storage media and/or other storage devices. The transceiver 230 can include a baseband circuit for processing a radio signal. When implemented in software, the aforementioned scheme may be implemented as a module (process, function, etc.) for performing the aforementioned function. The module can be stored in the memory and executed by the processor. The memory 220 may be placed inside or outside of the processor 210 and connected to the processor 210 using a variety of well-known means.

The computing device 200 can be implemented in a number of different forms, as describe above with respect to FIG. 2. For example, it may be implemented in the UE 101 and 102 or the core network (e.g., the UDM module 120) described with respect to FIG. 1.

The computing device 200 can be implemented in the wireless communication system 100 described above with respect to FIG. 1. For example, the various components included in the wireless communication system 100 can include the computing device 200.

Figure 4:
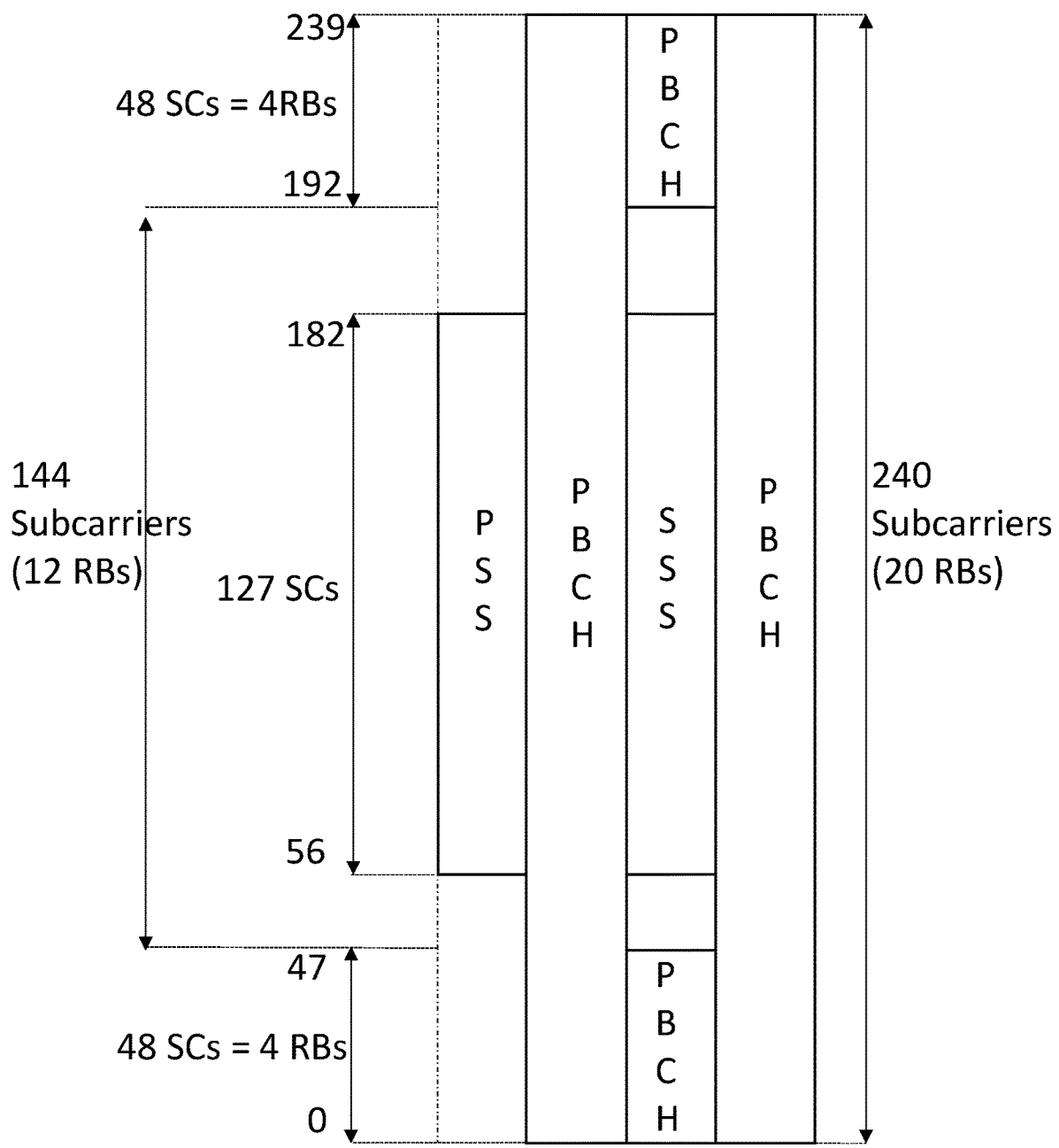
FIG. 4 is a diagram illustrating an example of structure of a synchronization signal block (SSB).

FIG. 3 is a diagram illustrating an example of resource blocks 301 and 302. FIG. 4 is a diagram illustrating an example of structure of a synchronization signal block (SSB) 400.

For example, the resource blocks 301 can be resource blocks configured for two antenna ports, and the resource blocks 302 can be resource blocks configured for four antenna ports.

The resource block can be the smallest unit of resources that can be allocated to a UE. In some implementations, a number of subcarriers used per resource block is 12 subcarriers and a number of symbols user per resource block is one symbol.

The resource block can refer to a finite unit of resources occupying a channel bandwidth and that can be allocated to the UE by the gNB (e.g., gNB 110, 111, or 112 in FIG. 1). In some implementations, a number of RBs can be determined based on a channel bandwidth that will be used. For example, a gNB configured with a 5 MHz channel bandwidth can use 25 RBs and a gNB configured with 10 MHz channel bandwidth can use 52 RBs, such that the number of RBs increases based on the channel bandwidth.

The resource block can include a plurality of resource elements, which is one subcarrier times one symbol (one subcarrier×one symbol) and includes a single complex value representing data from a physical channel or signal. For example, each column represents a symbol and each row represents a subcarrier in resource blocks 301 and 302.

In some implementations, the gNB can configure physical downlink control channel (PDCCH) A, PSS/SSS B, PBCH C, NZP CSI-RS CM D, and NZP CSI-RS IM E to occupy the plurality of resource elements in the resource blocks 301 and 302.

The gNB can configure the PDCCH A to occupy a specific number of resource elements according to its aggregation level. An aggregation level can be quantified in terms of the number of control channel elements (CCE) that it occupies. For example, 1 CCE is equivalent to 6 resource element groups (REG) which also equivalent to 72 resource elements.

The gNB can assign a specific aggregation level according to the UE coverage conditions. For example, the gNB can allocate a UE experiencing poor coverage with higher aggregation levels to allow increased channel coding gain, such as higher quantities of redundancy. By way of further example, the gNB can allocate a UE in good coverage with a lower aggregation level. In some implementations, a number of CCE is equivalent to a value of the aggregation level, such that the number of CCE increases as the value of the aggregation level increases.

The gNB can configure cyclic redundancy check (CRC) bits to be added to the PDCCH to allow error detection at the UE. In some implementations, if the gNB uses the PDCCH to allocate uplink resources on the PUSCH but the gNB does not receive a PUSCH transmission, then the gNB can deduce that the UE failed to receive the PDCCH.

The gNB can apply channel coding after the CRC bits have been added. The coding rate depends upon the aggregation level allocated to the PDCCH.

For example, the gNB can allocate a UE in weak coverage with a higher aggregation level, which would increase the number of resource elements available to transfer the PDCCH payload and allow the use of a lower coding rate (higher redundancy). The gNB can also allocate a UE in good coverage with a lower aggregation level, which would decrease the number of resource elements available to transfer the PDCCH payload and lead to a higher coding rate (lower redundancy).

The gNB can apply rate matching after the channel coding to ensure that the number of bits matches the capacity of resource elements available to the PDCCH after accounting for a demodulation reference signal (DMRS). A single CCE can accommodate 108 bits after accounting for the DMRS. The gNB can adjust a number of bits accommodated in the CCE.

The gNB can configure the PDCCH to inform a UE that it can access a particular RB (e.g., the resource block 301 or 302) at which the PDCCH occupies.

The PDCCH can span across the channel bandwidth or can be included in a control resource set (CORESET). In some implementations, the PDCCH can be included in 1, 2, or 3 symbols.

For example, the gNB can transmit the PDCCH using resource elements belong to a CORESET. A maximum of 3 CORESET can be configured for a specific serving cell.

The PDCCH can be mapped to a physical resource block or a group of resource blocks.

The gNB can configure the PSS/SSS B and PBCH C to occupy resource blocks 301 and 302. Referring FIG. 4, PSS/SSS B and PBCH C can be an SSB 400. The SSB 400 can refer to Synchronization Signal/Physical Broadcast Channel (SS/PBCH) block. FIG. 4 depicts the structure of the SSB 400 in 80 RBs (4 symbols×240 subcarriers).

The SSB 400 can be used during the cell search procedure. For example, a UE can search for Synchronization Signals (SS) when scanning for a cell to camp on. In some implementations, the SSB 400 can be used for Reference Signal Received Power (RSRP), Reference Signal Received Quality (RSRQ), and Signal to Interference plus Noise Ratio (SINR) measurements.

The SSB can be a downlink transmission, from the gNB to the UE, occupying 20 Resource Blocks (RB) in the frequency domain and 4 symbols in the time domain. In some implementations, the SSB can include a Primary Synchronization Signal (PSS), the Secondary Synchronization Signal (SSS), and the PBCH. The bandwidth of the SSB can be specified to ensure that it does not exceed the minimum UE bandwidth capability requirement for a specific operating band, such that all UE must be capable of receiving an SSB. Based on the SSS, the UE synchronizes with the network, thus gNB transmits the SSB with sufficient power for the UE to read the SSS.

In some implementations, as depicted in FIG. 4, the PSS can occupy 127 subcarriers within the first symbol, the SSS can occupy 127 subcarriers within the third symbol, and the PBCH can occupy 20 RBs (240 subcarriers) within the second and fourth symbols and 8 RBs (96 subcarriers) within the third symbol. The PBCH may not occupy one symbol for the SSS to occupy. The SSB 400 can be transmitted using an antenna port.

Referring to FIG. 3, the gNB can configure the UE to use the CSI-RS (e.g., CSI-RS D and CSI-IM E), which is a multi-purpose downlink transmission, for CSI reporting where the UE provides CSI reports to the gNB based upon measurements from the CSI-RS. For example, the UE can derive channel quality indicators (CQI), rank indicators (RI), and precoding matrix indicators (PMI) from CSI-RS measurements.

The CSI reporting can use "Non-Zero Power" (NZP) CSI-RS configured for "Channel Management" (CM) where dedicated signaling is used to configure the UE to receive these reference signals.

In some implementations, the NZP CSI-RS can also be configured for "Interference Measurement" (IM). A UE can be configured to complete interference measurements when generating CSI. For example, CQI reports are generated based upon a signal to interference plus noise ratio (SINR).

The gNB can configure a UE with one or more NZP CSI-RS resource sets, each resource set including one or more NZP CSI-RS resources.

The gNB can determine a number of CSI-RS resources based on a number of antenna ports. For example, two resource elements are occupied by CSI-RS CM D in the resource block 301 providing two different CSI-RS CM D for the UE to decode, where each of two antenna ports maps to one of the CSI-RS CM D. By way of further example, four resource elements in the resource block 302 are occupied by the CSI-RS CM D providing four different CSI-RS CM D for the UE to decode, where each of four antenna ports maps to one of the CSI-RS CM D.

In some implementations, the gNB transmits four different CSI-RS CM D at the same time to a UE for the UE to decode. Responsive to the transmitted CSI-RS CM D and based on transmission power of each of the four CSI-RS CM D, the UE can provide feedback to the gNB indicating that the UE could decode one or more CSI-RS among the four CSI-RS CM D, where the one or more CSI-RS map to different antenna ports. For example, if transmission power of one CSI-RS was below a threshold among the four CSI-RS CM D, the UE may provide feedback to the gNB that the UE could decode three particular CSI-RS. In some implementations, the UE can use a rank indicator to report a number of CSI-RS and which CSI-RS that the UE could decode.

Based on the feedback from the UE, the gNB can determine which antenna port to transmit data. For example, if the UE informs that the UE could decode a first CSI-RS among four CSI-RS, the gNB can use a first antenna port corresponding to the first CSI-RS to transmit data to the UE and use the remaining three antenna ports to transmit the same data sent through the first antenna port. By way of further example, if the UE informs that the UE could decode four CSI-RS among four CSI-RS, the gNB can use all four antenna ports to transmit four different data to the UE.

In some implementations, the gNB can transmit the CSI-RS from 1, 2, 4, 8, 12, 16, 24, or 32 antenna ports. Resource elements allocated to the CSI-RS can be populated using a pseudo random sequence.

The gNB can use dedicated signaling to configure the CSI-RS for each UE. In some implementations, multiple UEs can be provided with the same configuration information so the CSI-RS becomes shared between a group of UEs that would reduce the overhead generated by the CSI-RS. For example, when 3 UE are allocated with the same NZP CSI-RS CM and NZP CSI-RS IM resources, each UE can be configured to 2 NZP CSI-RS IM and 1 NZP CSI-RS CM. In this scenario, the resources are configured such that 2 UEs complete interference measurements while the $3^{rd}$ UE receives its NZP CSI-RS CM for channel measurement, such that 2 UEs measure the interference levels generated when transmissions are scheduled towards the $3^{rd}$ UE. This allows each UE to generate CQI reports which reflect the conditions including multiple UEs.

In some implementations, the overhead generated by the NZP CSI-RS can increase or decrease based on a number of UEs. For example, as described above, an example of 3 UEs requires the allocation of 3 NZP CSI-RS resources (2 NZP CSI-RS IM and 1 NZP CSI-RS CM), where the addition of a $4^{th}$ UE would require the allocation of a $4^{th}$ NZP CSI-RS resource, and so forth.

In some implementations, the gNB can transmit the PSS, the SSS, and the PBCH with identical power. For example, the PSS can be transmitted using an energy per resource element (EPRE) which is equal to the SSS EPRE, where the EPRE refers to the power per resource element. The gNB can adjust an EPRE for the SSB including the PSS, the SSS, and the PBCH based on information provided by the UE. For example, the information can include acknowledgement information and the CSI report from the UE.

In some implementations, the gNB can adjust transmission power of the resource elements occupied by CSI-RS. For example, resource elements for the CSI-RS can be transmitted with different power or identical power. The transmission power for the CSI-RS can be adjusted based on the CSI report provided from the UE.

A transmission period of the SSB can be determined by the gNB. For example, the gNB can transmit the SSB every 20 ms or 5 ms.

In some implementations, the CSI-RS resources can be configured as aperiodic, semi-persistent, or periodic for transmission.

Aperiodic CSI-RS resources can be triggered using Downlink Control Information (DCI) on the PDCCH, semi-persistent CSI-RS resources are triggered using MAC Control Elements (MAC CE), periodic CSI-RS resources can be triggered using an RRC message.

The UE can make various measurements and report the measurements to the gNB. In some implementations, the measurements are made based on the SSB and CSI-RS.

The UE can report Channel State Information (CSI) to the gNB using either a PUSCH or a PUCCH. The gNB can use the CSI to support its downlink transmission on the PDSCH and PDCCH. In some implementations, the CSI can include a channel quality indicator (CQI), CSI-RS resource indicator (CRI), a rank indicator (RI), and a precoding matrix indicator (PMI).

The gNB can use this information for selecting UE to receive resource allocations. In some implementations, the CSI can be used when selecting an appropriate CCE aggregation level. For example, a UE in poor coverage area can be allocated with higher aggregation levels.

The CSI reporting relies upon UE completing downlink measurements and subsequently providing feedback to the gNB. These measurements are based upon CSI-RS resources. The CSI-RS resources can use (i) an information element regarding the resources for CM to specify a NZP CSI-RS for measuring the propagation channel based upon a "wanted" signal and (ii) an information element regarding the NZP CSI-RS IM to specify CSI-RS resource which the serving cell uses for transmission towards other UE (typically using different downlink beams). These resources allow the UE to measure the interference experienced when using Multi-User MIMO (MU-MIMO), such as multiple spatially separated UEs sharing the same downlink RBs.

The gNB can configure the CSI-RS to allow the CSI measurements to use a periodic, semi-persistent, or aperiodic triggering mechanism.

In some implementations, the CSI-RS transmissions which are used to derive the CSI measurements can also be periodic, semi-persistent, or aperiodic. For example, an aperiodic CSI report can be generated using a periodic CSI-RS transmission.

The UE can generate CQI values related to downlink radio channel conditions within a specific bandwidth part and report the CQI values in the CSI report to the gNB.

The gNB can use the CQI values to select a UE for resource allocation. For example, a UE reporting high CQI values relative to their average CQI values are more likely to be selected for resource allocation.

In some implementations, the CQI values can indicate how much data can be packed into each resource element.

For example, the UE can inform, through the uplink control region, the gNB a number of bits the gNB can include in each resource element, where the remaining bits will be used for error correction information. The bits for error correction information can be replaced for correcting any detected errors. The number of bits that the gNB can include in each resource element can refer to a number of bits that the UE could read.

The UE can also report synchronization signal-signal to interference and noise ratio (SS-SINR) measurement to the gNB. The SS-SINR can represent the ratio of the wanted signal power to the interference plus noise power, where both the wanted signal power and the interference plus noise power are measured from resource elements used by the SSS. For example, the UE can inform the gNB through the SS-SINR measurement that the UE received data at a certain level, the intensity of the data, and whether the UE was able to read the data or not.

The UE can also report CSI-SINR measurement to the gNB. The CSI-SINR can represent the ratio of the wanted signal power to the interference plus noise power, where both the wanted signal power and the interference plus noise power are measured from resource elements used by the CSI-RS. For example, the UE can inform the gNB through the CSI-SINR measurement that the UE received data at a certain level, the intensity of the data, and whether the UE was able to read the data or not.

The UE can measure received signal strength indicator (RSSI) at resource blocks. For example, the RSSI can be measured from resource blocks occupied by the SSS. In some implementations, the UE can report the RSSI to the gNB.

The gNB can use power headroom (PHR) reports from the UE to identify the number of resource block to be allocated to the PUSCH. In some implementations, the gNB may restrict the number of allocated resource blocks if the UE is reporting a low power headroom.

In some implementations, the gNB can use the PHR reports to calculate the path loss toward the UE, where these path loss results can then be used to enable or disable specific functionality. The PHR reports can include PHR values occupying a set of 6 bits providing range from 0 to 63.

Using information related to UE measurements, the gNB can adjust transmission power of the SSB as describe below with respect to FIG. 5.

Figure 5:
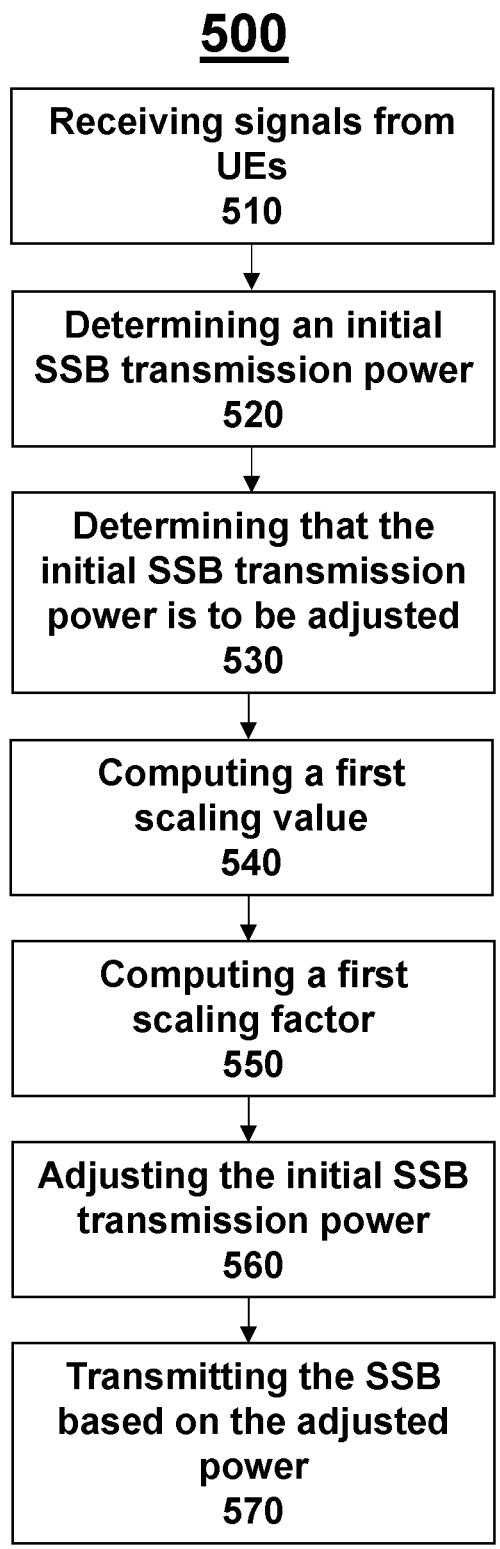
FIG. 5 is a flowchart showing SSB transmission power adjustment procedure.

FIG. 5 is flowchart showing SSB transmission power adjustment procedure 500. In the following flowchart, at least one step may be omitted or a new step may be added.

As described above, the gNB configures the SSB and the CSI-RS in the resource blocks to be transmitted to a UE for the UE to decode the SSB and the CSI-RS. The gNB can also configure transmission power of the SSB and the CSI-RS by adjusting the EPRE of the SSB and the CSI-RS. The transmission power of the SSB and the CSI-RS may be sufficient for the UE to decode the SSB and the CSI-RS. Thus, the SSB transmission power adjustment procedure 500 provides dynamic adjustment of the transmission power of the SSB for the gNB to add more UEs to the cell by increasing the transmission power of the SSB or reduce a number of UEs from the cell by decreasing the transmission power of the SSB.

For example, as analogies provided for explanation, a teacher (gNB) can adjust power of a light bulb (transmission power) for one or more students (UEs) to read contents (an SSB or a CSI-RS) written on a whiteboard (an antenna port). In this scenario, a number of students who can read the contents on the whiteboard may vary based on the power of the light bulb, thus the power of the light bulb may be adjusted for the students to read the contents on the whiteboard.

The teacher (gNB) can adjust the power of the light bulb by asking the students (UEs) to read the contents written on the whiteboard (the SSB and the CSI-RS), which the teacher knows. The teacher can evaluate the feedback from the students and adjust the power of the light bulb based on the feedback.

Similarly, the gNB can transmit the SSB and the CSI-RS in resource blocks for one or more UEs to decode and provide feedback on the transmitted SSB and CSI-RS.

In step 510, the gNB can receive signals from one or more UEs, where the signals include at least one parameter indicative of corresponding operating conditions at the one or more UEs. For example, the signals can be feedback from the one or more UEs on the transmitted SSB and CSI-RS.

The at least one parameter indicative of corresponding operating conditions at the one or more UEs can include a CQI value indicating how much data can be packed into each resource element, which is described above with respect to FIGS. 3 and 4.

In some implementations, the at least one parameter can include various measurements from the UE described above with respect to FIGS. 3 and 4.

In some implementations, the at least one parameter can include a SS-SINR or a CSI-SINR described above with respect to FIGS. 3 and 4.

In some implementations, the at least one parameter can include a PHR value in power headroom (PHR) reports identifying the number of resource block to be allocated to the PUSCH, which is described above with respect to FIGS. 3 and 4. For example, the UE can inform the gNB through the PHR report that the UE does not have sufficient power to reach any further distance.

In some implementations, the at least one parameter can include acknowledgement and negative acknowledgement information. For example, acknowledgement information can indicate that data the UE received from the gNB did not have any errors. By way of further example, negative acknowledgement information can indicate that the data was received with errors or was otherwise unreadable.

In step 520, the gNB can determine an SSB transmission power. For example, the SSB can be transmitted with predetermined power.

In step 530, the gNB can determine, based on the at least one parameter received from the one or more UEs in step 510, that the initial SSB transmission power is to be adjusted to affect the corresponding operating condition of the one or more UEs.

For example, the gNB can monitor following metrics simultaneously to determine whether the initial SSB transmission power is to be adjusted.

In some implementations, the gNB can determine whether a CQI value in a CSI report from each of the one or more UEs is greater than a predetermined CQI threshold. As described above, the CQI value can indicate how much data the gNB can be pack into each resource element. Thus, if the CQI value is greater than the CQI threshold, the gNB can determine the SSB transmission power to be increased for another UEs to camp on the cell per available resources.

In some implementations, the gNB can determine whether intensity of data measured by the one or more UEs is less than a predetermined threshold. For example, as described above, the UE can inform the gNB through the SS-SINR measurement that the UE received data at a certain level, the intensity of the data, and whether the UE was able to read the data or not. If the intensity of the data is less than the predetermined threshold, the gNB can determine the SSB transmission power to be increased.

In some implementations, the gNB can determine whether a maximum timing advance assigned to one of the one or more UEs is greater than a predetermined threshold. A UE closest to the gNB is assigned with the minimum timing advance while a UE farthest from the gNB is assigned with the maximum timing advance. If the maximum timing advance is greater than the predetermined threshold, the gNB can determine the SSB transmission power to be increased for signals from the gNB to reach the farthest UE.

In some implementations, the gNB can determine whether a PHR value in a PHR report is less than a predetermined threshold. As described above, the PHR value in the PHR reports identifies a number of resource block to be allocated to a PUSCH. If the allocated resource block is less than the predetermined threshold, it may refer that the UE does not have sufficient power to transmit data to the gNB. Thus, the gNB can determine the SSB transmission power to be decreased for another antenna port (or another cell) to cover the UE.

In some implementations, the gNB can determine whether a block error rate is greater than a predetermined threshold. For example, as analogies provided for explanation, a teacher (gNB) can ask one or more students (UEs) to read one or more letters (data) on a whiteboard (antenna). Based on the feedback from the one or more students, the teacher can calculate a block error rate by dividing a number of erroneous received letters over a number of the one or more letters on the whiteboard. If the block error rate is greater than the predetermined threshold, the teacher can increase power of a light bulb (transmission power) for the one or more students to read better. Likewise, the gNB can increase transmission power of the SSB for the one or more UEs to decode the SSB to reduce the block error rate.

In some implementations, the gNB can determine whether a number of physical resource blocks utilized in the resource blocks is less than a predetermined threshold. For example, if the UE reports to the gNB that the UE utilizes 10 resource blocks among 50 resource blocks, the gNB can increase transmission power of the SSB so more resource blocks are utilized to add more UEs to the cell. By way of further example, if the UE reports to the gNB that the UE utilizes 40 resource blocks among 50 resource blocks, the gNB may not increase transmission power of the SSB because there are only limited resource blocks are available for other UEs.

In some implementations, the gNB can determine whether a number of utilized PDCCH among all PDCCH blocks is less than a predetermined threshold. For example, if the UE reports to the gNB that 20 PDCCH blocks are utilized among 50 PDCCH blocks and 100 physical resource blocks are available, the gNB can increase transmission power of the SSB so more resource blocks are utilized to add more UEs to the cell. By way of further example, if the UE reports to the gNB that the UE utilizes 40 PDCCH blocks are utilized among 50 PDCCH blocks and 100 physical resource blocks are available, the gNB may not increase transmission power of the SSB because there are only limited PDCCH blocks are available for other UEs to be assigned to the remaining PDCCH blocks. In this scenario, more UEs cannot be added to the cell by increasing the transmission power of the SSB because the gNB cannot schedule a new UE.

In some implementations, the gNB can determine whether a physical random access channel (PRACH) failure rate is less than a predetermined threshold. The PRACH is used to transmit random access preambles by a UE to request an uplink control resource allocation from the gNB, but the UE may not receive a message for the transmitted preamble if the gNB cannot allocate uplink control resources for the UE such that the PRACH has failed. Thus, if the PRACH failure rate is less than the predetermined threshold, the gNB can increase transmission power of the SSB for more UEs to be connected. However, if the PRACH failure rate is greater than or equal to the predetermined threshold, the gNB may not increase the transmission power of the SSB because a high PRACH failure rate indicates that the uplink control resource is at full capacity for a UE to be connected.

In some implementations, the gNB can determine whether a number of the one or more UEs connected to the gNB is less than a predetermined threshold. If the number is less than the threshold, the gNB can increase the transmission power of SSB for more UEs to be connected, and, if the number is greater than or equal to the threshold, the gNB may not increase the transmission power of SSB. In some implementations, the predetermined threshold can refer to a limit that is set by software implemented in the gNB, where the software may not handle a number of UEs more than the limit.

In some implementations, the gNB can determine whether a distance from a UE to a next cell associated with another antenna is less than threshold. For example, a UE can be located at an edge of coverage area of a home cell of a first antenna, where the edge overlaps with coverage area of a next cell of another antenna. In this case, if transmission power of the SSB for the home cell is too high, then the UE may experience interference. Thus, the gNB can reduce the transmission power of the SSB for the home cell to reduce the interference.

For example, as analogies provided for explanation, a student (UE) may be located at location where the student can read a first whiteboard (a first antenna) with a first light bulb (first transmission power) and a second whiteboard (a second antenna) with a second light bulb (second transmission power). However, if the intensity of the first light bulb is too high when the student is expected to move toward the second whiteboard, the student might be interfered to read the whiteboards. Thus, a teacher (gNB) can reduce the intensity of the first light bulb to reduce the interference.

In some implementations, the gNB can determine whether a number of CSI-RS resources that the UE could decode, which corresponds to a number of antenna ports that can transmit different data, is less than a predetermined threshold. For example, the gNB may set two antenna ports to transmit data. However, if the UE reported that the UE could only decode one CSI-RS (one antenna port), the gNB can increase the transmission power of the SSB.

In some implementations, the gNB can determine whether a number of physical resource blocks missed due to PDCCH congestion is less than a threshold. In some examples, physical resource blocks (e.g., unoccupied resource blocks in resource blocks 301 and 302) may be available while PDCCH blocks are not available, where the PDCCH maps to the physical resource blocks and more PDCCH blocks are needed to map to the physical resource blocks for a farther UE. Thus, as a distance to the UE increase, more PDCCH blocks are needed to transmit the same resource block to a single UE. In this scenario, the gNB can determine the transmission power of the SSB to be reduced to reduce a number of UEs connected to the cell.

In some implementations, the gNB can determine whether a physical resource blanking feature is on. For example, some of physical resource blocks can be blocked to be allocated by regulation. Thus, the gNB does not have to scale up the transmission power of the SSB because the gNB already knows that some physical resource blocks are not available.

In some implementations, the gNB can determine whether RB randomization is needed. For example, CSI-RS IM has different resource elements assigned in different sectors to ensure interference from other sectors are accounted for and reported by the UE, which can be utilized to determine whether the RB randomization is needed. If the gNB determines that RB randomization is needed, the gNB can determine the transmission power of the SSB to be not increased to ensure connection between the one or more and the cell. If the gNB determines that RB randomization is not needed, the gNB can determine the transmission power of the SSB to be increased to increase a number of UEs connected to the cell.

In some implementations, the gNB can determine whether a transport capacity is less than a predetermined threshold. For example, The gNB can measure the transport capacity based on the data packet loss rate/latency computed for various instantaneous data rates. If the gNB determines that data the gNB can send to the UE is less than the predetermined threshold, the gNB can determine the transmission power of the SSB to be increased.

In some implementations, the gNB can determine whether a radio link failure (RLF) percentage is greater than a predetermined threshold. The gNB can determine the RLF percentage based on both DL/UL radio access network (RAN) channel conditions and UE Connection Manager status change/link loss/no response from UE event at gNB & RLF based hand over trigger, and an RRC reestablishment from UE. For example, if the RLF percentage is greater than the predetermined threshold, the gNB can determine the transmission power of the SSB to be decreased.

The gNB does not only use one of the metrics to determine adjustment of the transmission power of the SSB, but uses all of the metrics simultaneously to make a determination.

For example, the network may experience uplink and downlink coverage imbalance when the gNB transmits resource blocks to the UE but the gNB does not receive any responses from the UE. When the gNB expected power change in the uplink transmission from the UE in response to the transmitted resource blocks but does not see the power change, the gNB can reduce the transmission power of the SSB if the percentage of UEs associated with the imbalance is greater than a predetermined threshold. The gNB may reduce the transmission power to reduce a number of UEs camped at the cell to have more uplink resources available.

The adjustment of transmission power of the SSB can improve mobility of the UE within the coverage area. For example, the gNB can adjust transmission power of the SSB for each cell based on movement of the UE because, if the intensity of transmission is too high, the UEs may experience interference.

In some implementations, the gNB can decrease the transmission power of the SSB when the UE leaves a coverage area of the cell, based on the report from the UE described above, because the transmission power may cause interference for other UEs.

In some implementations, the gNB can reduce the transmission power for the mobility based on the measurement report from the UE that includes transmission power from other cells. The reduction of the transmission power can shrink the interference zone that would reduce interference issues and avoid waste of resources. In some implementations, the measurement report can be sent from the UE periodically or by request, which would inform the gNB power information of the UE, experience to the specific cell the UE is serving, or power information of nearby cells.

In step 540, responsive to determining that the initial SSB transmission power is to be adjusted, the gNB can compute a first scaling value.

For example, the gNB can compute the first scaling value by assigning a value for each of the metrics described above with respect to step 530 and determine the average value of the values of the metrics as the first scaling value.

In some implementations, the gNB can assign different weights to the metrics based on a percentage of UEs experiencing failure and determine the weighted average of the metrics as the first scaling value.

In step 550, the gNB can compute a first scaling factor (×dB).

For example, if the gNB wants to transmit the SSB in all four antenna ports, then the gNB may use full power, and, if the gNB wants to transmit the SSB in two antenna ports, then the gNB may use half power.

Further, the gNB can determine at what dB to scale the transmission power. The determination of the dB can be based on the SSB (e.g., the SSB 400 in FIG. 4) occupying 20 RBs. To scale up the transmission power of the RB, the SSB resource blocks burrow power from the neighboring blocks.

The SSB can be transmitted from all 4 antenna ports in case of 4T4R (MIMO) System or the gNB can transmit using only 2 antenna ports even in any N port Antenna system where N takes value greater than or equal to 2. The gNB can determine the first scaling factor (×dB) based on the number of antenna ports used for SSB transmission along with a number of resource elements available in that symbol where SSB is transmitted leveraging the power available to increase the SSB transmission power.

In step 560, the gNB can adjust the initial SSB transmission power based on the first scaling value and the first scaling factor to compute an adjusted transmission power.

For example, the gNB can determine a value obtained by multiplying the computed first scaling factor to the computed first scaling factor as adjusted transmission power and adjust the initial SSB transmission power to the adjusted transmission power.

In step 570, the gNB can transmit the SSB based on the adjusted transmission power.

Figure 6:
FIG. 6 is flowchart showing a flowchart showing a SSB transmission adjustment determination procedure described in FIG. 5.

FIG. 6 is flowchart showing a flowchart showing a SSB transmission adjustment determination procedure performed to determine that the initial SSB transmission power is to be adjusted describe above with respect to FIG. 5. In the following flowchart, at least one step may be omitted or a new step may be added.

In step 531, the gNB can determine at least one of cell load, a mobility success rate, or interference measurement based on the corresponding at least one parameter received from the one or more UEs. For example, as described above with respect to step 530, the gNB can determine at least one of the cell load, the mobility success rate, or the interference measurement based on information received from the UE.

In step 532, the gNB can determine that the transmission power needs to be adjusted based on the determined at least one of the cell load, the mobility success rate, or the interference measurement from step 531.

Figure 7:
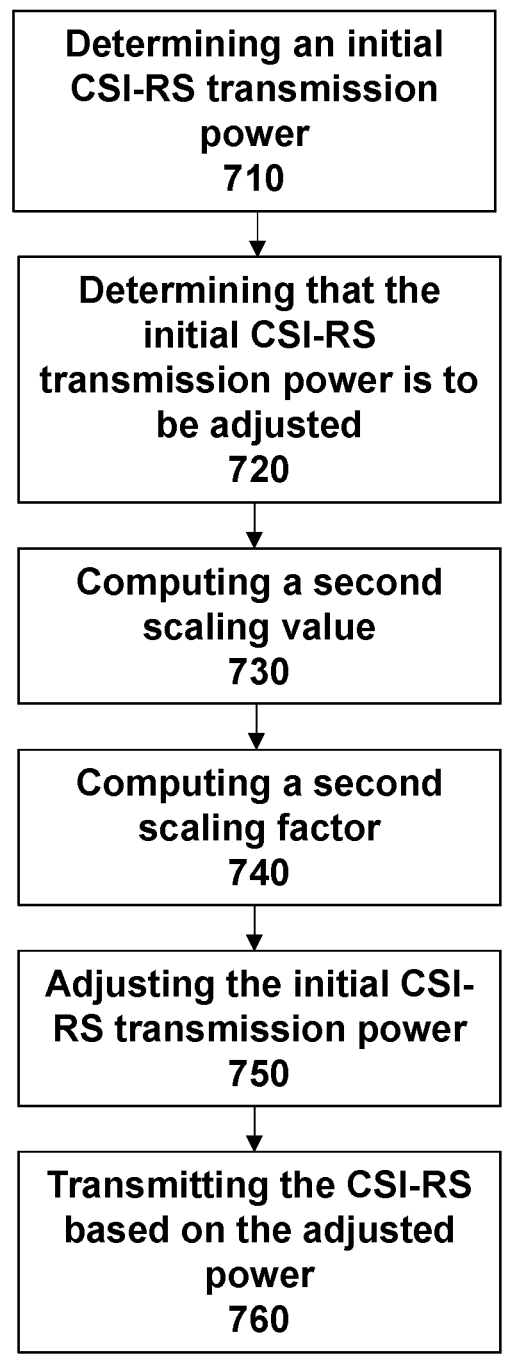
FIG. 7 is a flowchart showing CSI-RS transmission power adjustment procedure.

FIG. 7 is flowchart showing CSI-RS transmission power adjustment procedure 700. In the following flowchart, at least one step may be omitted or a new step may be added.

As described above, the gNB configures the CSI-RS in the resource blocks to be transmitted to a UE for the UE to decode the CSI-RS. The gNB can also configure transmission power of the CSI-RS by adjusting the EPRE of the CSI-RS. The transmission power of the CSI-RS may be sufficient for the UE to decode the SSB and the CSI-RS. Thus, the CSI-RS transmission power adjustment procedure 700 provides dynamic adjustment of the transmission power of the CSI-RS based on report from the one or more UEs indicating how many antenna ports, which correspond to CSI-RS, can be utilized. For example, based on how many CSI-RS the UE could decode, which indicate how many antenna ports can be utilized, the gNB can adjust the transmission power of the CSI-RS to add more layers through which information is sent and to add more information to be sent to the UE by increasing the transmission power of the CSI-RS or reduce the layers and the information by decreasing the transmission power of the CSI-RS.

In step 710, the gNB can determine an initial CSI-RS transmission power.

For example, similar to step 520 described above, the CSI-RS can be transmitted with predetermined power.

In step 720, the gNB can determine, based on the at least one parameter received from the one or more UEs, that the initial CSI-RS transmission power is to be adjusted to affect the corresponding operating condition of the one or more UEs.

For example, the gNB can monitor following metrics simultaneously to determine whether the initial CSI-RS transmission power is to be adjusted.

In some implementations, the gNB can determine whether a CQI value in a CSI report from each of the one or more UEs is less than a predetermined CQI threshold. As described above, the CQI value can indicate how much data the gNB can be pack into each resource element. Thus, if the CQI value is less than the CQI threshold, the gNB can determine the CSI-RS transmission power to be increased to increase information and layers through which the information is sent.

In some implementations, the gNB can determine whether a maximum timing advance assigned to one of the one or more UEs is greater than a predetermined threshold. A UE closest to the gNB is assigned with the minimum timing advance while a UE farthest from the gNB is assigned with the maximum timing advance. If the maximum timing advance is greater than the predetermined threshold, the gNB can determine the CSI-RS transmission power to be increased to increase information and layers through which the information is sent to ensure the information to reach the farthest UE.

In some implementations, the gNB can determine whether a block error rate is greater than a predetermined threshold. For example, as analogies provided for explanation, a teacher (gNB) can ask one or more students (UEs) to read one or more letters (data) on a whiteboard (antenna). Based on the feedback from the one or more students, the teacher can calculate a block error rate by dividing a number of erroneous received letters code blocks over a number of the one or more letters on the whiteboard. If the block error rate is greater than the predetermined threshold, the teacher can increase power of a light bulb (transmission power) for the one or more students to read better. Likewise, the gNB can increase transmission power of the CSI-RS for the one or more UEs to decode the CSI-RS with greater accuracy.

In some implementations, the gNB can determine whether a number of the one or more UEs connected to the gNB is less than a predetermined threshold. If the number is less than the threshold, the gNB can increase the transmission power of CSI-RS, and, if the number is greater than or equal to the threshold, the gNB may not increase the transmission power of CSI-RS. In some implementations, the predetermined threshold can refer to a limit that is set by software implemented in the gNB where the software may not handle a number of UEs more than the predetermined threshold.

In some implementations, the gNB can determine whether a number of CSI-RS resources that the UE could decode, which corresponds to a number of antenna ports that can transmit different data, is less than a predetermined threshold. For example, the gNB may set two antenna ports to transmit data. However, if the UE reported that the UE could only decode one CSI-RS (one antenna port), the gNB can increase the transmission power of the CSI-RS.

In some implementations, the gNB can determine whether a number of physical resource blocks missed due to PDCCH congestion is less than a threshold. In some examples, physical resource blocks (e.g., unoccupied resource blocks in resource blocks 301 and 302) may be available while PDCCH blocks are not available, where the PDCCH maps to the physical resource blocks and more PDCCH blocks are needed to map to physical resource blocks for a farther UE. Thus, as a distance to the UE increase, more PDCCH blocks are needed to transmit the same resource block to a single UE. In this scenario, the gNB can reduce the transmission power of the CSI-RS.

In some implementations, the gNB can determine whether a physical resource blanking feature is on. For example, some of physical resource blocks can be blocked to be allocated by regulation. Thus, the gNB does not have to scale up the transmission power of the CSI-RS because the gNB already knows that some physical resource blocks are not available.

In some implementations, the gNB can determine whether RB randomization is needed. For example, CSI-RS IM has different resource elements assigned in different sectors to ensure interference from other sectors are accounted for and reported by the UE, which can be utilized to determine whether the RB randomization is needed. If the gNB determines that RB randomization is needed, the gNB can determine the transmission power of the CSI-RS to be not increased, or, if the gNB determines that RB randomization is not needed, the gNB can determine the transmission power of the CSI-RS to be increased.

In some implementations, the gNB can determine whether a transport capacity is less than a predetermined threshold. For example, the gNB can measure the transport capacity based on the data packet loss rate/latency computed for various instantaneous data rates. If the gNB determines that data the gNB can send to the UE is less than the predetermined threshold, the gNB can determine the transmission power of the CSI-RS to be increased.

In some implementations, the gNB can determine whether a radio link failure (RLF) percentage is greater than a predetermined threshold. The gNB can determine the RLF percentage based on both DL/UL radio access network (RAN) channel conditions and UE Connection Manager status change/link loss/no response from UE event at gNB & RLF based hand over trigger, and an RRC reestablishment from UE. For example, if the RLF percentage is greater than the predetermined threshold, the gNB can determine the transmission power of the CSI-RS to be decreased.

The gNB does not only use one of the metrics to determine to adjust the transmission power of the CSI-RS, but uses all of the metrics described simultaneously to make a determination.

Moreover, the procedure 500 and the procedure 700 are described as separate procedures but the gNB can perform the procedures simultaneously and update the transmission power of the SSB and the CSI-RS based on the metrics described above.

Furthermore, gNB can perform the procedure described in FIG. 6 (e.g., steps 531 and 532), which determines that the initial CSI-RS transmission power is to be adjusted. For example the gNB can determine at least one of cell load, a mobility success rate, or interference measurement based on the corresponding at least one parameter received from the one or more UEs. For example, the gNB can determine at least one of the cell load, the mobility success rate, or the interference measurement based on information received from the UE. By way of further example, the gNB can determine that the transmission power needs to be adjusted based on the determined at least one of the cell load, the mobility success rate, or the interference measurement.

In step 730, responsive to determining that the initial CSI-RS transmission power is to be adjusted, the gNB can compute a second scaling value.

For example, the gNB can compute the second scaling value by assigning a value for each of the metrics described above with respect to steps 530 and 720, and determine the average value of the values of the metrics as the second scaling value.

In some implementations, the gNB can assign different weights to the metrics based on a percentage of UEs experiencing failure and determine the weighted average of the metrics as the second scaling value.

In step 740, the gNB can compute a second scaling factor (xdB).

For example, if the gNB wants to transmit the CSI-RS in all four antenna ports, then the gNB may use full power, and, if the gNB wants to transmit the CSI-RS in two antenna ports, then the gNB may use half power.

Further, the gNB can determine at what dB to scale the transmission power. The determination of the dB can be based on the SSB (e.g., the SSB 400 in FIG. 4) occupying 20 RBs. To scale up the transmission power of the RB, the SSB resource blocks burrow power from the neighboring blocks.

The CSI-RS can be transmitted from all 4 antenna ports in case of 4T4R (MIMO) System or the gNB can transmit using only 2 antenna ports even in any N port Antenna system where N takes value greater than or equal to 2. The gNB can determine the second scaling factor (xdB) based on the number of antenna ports used for CSI-RS transmission along with a number of resource elements available in that symbol where SSB is transmitted leveraging the power available to increase the CSI-RS transmission power.

In step 750, the gNB can adjust the initial CSI-RS transmission power based on the second scaling value and the second scaling factor to compute an adjusted transmission power.

For example, the gNB can determine a value obtained by multiplying the computed second scaling value to the computed second scaling factor as adjusted transmission power, and adjust the initial CSI-RS transmission power to the adjusted transmission power.

In step 760, the gNB can transmit the CSI-RS based on the adjusted transmission power.

Although a few implementations have been described in detail above, other modifications may be made without departing from the scope of the inventive concepts described herein, and, accordingly, other implementations are within the scope of the following claims.

What is claimed is:

1. A method for performing a power scaling at a base station (BS) of a wireless communication system, the method comprising:
   receiving signals from one or more user equipment (UE), the signals including at least one parameter indicative of corresponding operating conditions at the one or more UEs;
   determining an initial synchronization signal block (SSB) transmission power;
   determining, based on the at least one parameter, that the initial SSB transmission power is to be adjusted to affect the corresponding operating condition;
   responsive to determining that the initial SSB transmission power is to be adjusted, computing a first scaling value, wherein computing the first scaling value comprises assigning values to a plurality of metrics indicative of the operating conditions and computing an aggregate representation of the metrics;
   computing a first scaling factor, wherein the first scaling factor is determined based on transmission configuration parameters, including at least one of a number of antenna ports used for SSB transmission or a number of resource elements available for SSB transmission;
   adjusting the initial SSB transmission power based on the first scaling value and the first scaling factor to compute an adjusted transmission power; and
   transmitting the SSB based on the adjusted transmission power.

2. The method of claim 1, wherein the at least one parameter is indicative of a failure rate associated with the one or more UEs.

3. The method of claim 2, wherein the first scaling factor increases with the failure rate.

4. The method of claim 1, wherein determining that the transmission power is to be adjusted comprises:
   determining at least one of cell load, a mobility success rate, or interference measurement based on the corresponding at least one parameter, and
   determining that the transmission power is to be adjusted based on the determined at least one of the cell load, the mobility success rate, or the interference measurement.

5. The method of claim 1, wherein the transmission power for the SSB is adjusted to a value determined as a product of the scaling value and the scaling factor.

6. The method of claim 1, further comprising:
   determining an initial channel state information-reference signal (CSI-RS) transmission power;
   determining, based on the at least one parameter, that the CSI-RS transmission power is to be adjusted in accordance with the corresponding operating condition;
   responsive to determining that the CSI-RS transmission power is to be adjusted, computing a second scaling value, wherein computing the second scaling value comprises assigning values to a plurality of metrics indicative of the operating conditions and computing an aggregate representation of the metrics;
   computing a second scaling factor, wherein the second scaling factor is determined based on transmission configuration parameters, including at least one of a number of antenna ports used for CSI-RS transmission or a number of resource elements available for CSI-RS transmission;
   adjusting the initial CSI-RS transmission power based on the second scaling value and the second scaling factor to compute an adjusted CSI-RS transmission power; and
   transmitting the CSI-RS based on the adjusted CSI-RS transmission power.

7. The method of claim 6, wherein the at least one parameter is indicative of a failure rate associated with the one or more UEs.

8. The method of claim 7, wherein the second scaling factor increases with the failure rate.

9. A base station for performing a power scaling in a wireless communication system, the base station comprising:
   memory;
   at least one transceiver; and
   at least one processor, coupled to the memory and the transceiver, the at least one processor configured to:
      receive signals from one or more user equipment (UE), the signals including at least one parameter indicative of corresponding operating conditions at the one or more UEs;
      determine an initial synchronization signal block (SSB) transmission power;
      determine, based on the at least one parameter, that the initial SSB transmission power is to be adjusted to affect the corresponding operating condition;
      responsive to determining that the initial SSB transmission power is to be adjusted, compute a first scaling value, wherein computing the first scaling value comprises assigning values to a plurality of metrics indicative of the operating conditions and computing an aggregate representation of the metrics;
      compute a first scaling factor, wherein the first scaling factor is determined based on transmission configuration parameters, including at least one of a number of antenna ports used for SSB transmission or a number of resource elements available for SSB transmission;
      adjust the initial SSB transmission power based on the first scaling value and the first scaling factor to compute an adjusted transmission power; and
      transmit the SSB based on the adjusted transmission power.

10. The base station of claim 9, wherein the at least one parameter is indicative of a failure rate associated with the one or more UEs.

11. The base station of claim 10, wherein the first scaling factor increases with the failure rate.

12. The base station of claim 9, wherein determining that the transmission power is to be adjusted comprises:
   determining at least one of cell load, a mobility success rate, or interference measurement based on the corresponding at least one parameter, and
   determining that the transmission power is to be adjusted based on the determined at least one of the cell load, the mobility success rate, or the interference measurement.

13. The base station of claim 9, wherein the transmission power for the SSB is adjusted to a value determined as a product of the scaling value and the scaling factor.

14. The base station of claim 9, wherein the at least one processor is further configured to:
   determine an initial channel state information-reference signal (CSI-RS) transmission power,
   determine, based on the at least one parameter, that the CSI-RS transmission power is to be adjusted in accordance with the corresponding operating condition,
   responsive to determining that the CSI-RS transmission power is to be adjusted, compute a second scaling value, wherein computing the second scaling value comprises assigning values to a plurality of metrics indicative of the operating conditions and computing an aggregate representation of the metrics, compute a second scaling factor, wherein the second scaling factor is determined based on transmission configuration parameters, including at least one of a number of antenna ports used for CSI-RS transmission or a number of resource elements available for CSI-RS transmission, adjust the initial CSI-RS transmission power based on the second scaling value and the second scaling factor to compute an adjusted CSI-RS transmission power, and transmit the CSI-RS based on the adjusted CSI-RS transmission power.

15. The base station of claim 14, wherein the at least one parameter is indicative of a failure rate associated with the one or more UEs.

16. The base station of claim 15, wherein the second scaling factor increases with the failure rate.

* * * * *